US012773073B1

(12) United States Patent
David et al.

(10) Patent No.: US 12,773,073 B1
(45) Date of Patent: Oct. 27, 2026

(54) COMPACT COOKWARE AND UTENSIL STORAGE SYSTEM

(71) Applicant: Common Kin LLC, Cincinnati, OH (US)

(72) Inventors: Mourad David, Cincinnati, OH (US); Ian Malott, Cincinnati, OH (US)

(73) Assignee: Common Kin LLC, Cincinnati, OH (US)

( * ) Notice: Subject to any disclaimer, the term of this patent is extended or adjusted under 35 U.S.C. 154(b) by 225 days.

(21) Appl. No.: 18/313,762

(22) Filed: May 8, 2023

Related U.S. Application Data

(60) Provisional application No. 63/340,208, filed on May 10, 2022.

(51) Int. Cl.
*A47J 47/16* (2006.01)

(52) U.S. Cl.
CPC .................................... *A47J 47/16* (2013.01)

(58) Field of Classification Search
CPC ....... A47J 47/16; A47J 47/005; A47B 49/004; A47B 49/00; A47B 49/008; A47B 81/04; A47B 81/02; A47B 81/00; A47G 21/145; A47G 21/14
See application file for complete search history.

(56) References Cited

U.S. PATENT DOCUMENTS 177,479 A * 5/1876 Danner .................. A47B 49/00 108/103
565,083 A * 8/1896 Lynne .................... A47B 49/00 108/103
673,755 A * 5/1901 Brown ................... A47B 49/00 312/285
888,142 A * 5/1908 Bonesteel ............ A47B 49/004 312/285
1,929,677 A * 10/1933 Davis ...................... A47B 49/00 312/285
1,930,844 A * 10/1933 Ruddell ................. A47B 49/00 211/144
2,229,171 A * 1/1941 Gritton ..................... A47F 5/02 108/94
3,485,543 A * 12/1969 Lee ....................... A47B 95/008 312/328
5,101,738 A * 4/1992 Sideris ................. A47B 63/062 211/144
5,117,989 A * 6/1992 Ross ....................... A47B 63/00 211/186
5,183,165 A * 2/1993 Acona .................... A47B 73/00 211/74
5,651,595 A * 7/1997 Willis ................ G11B 33/0438 312/285
5,775,518 A * 7/1998 Connor .................. A47G 21/14 248/37.3
5,850,784 A * 12/1998 Conner ................. A47J 47/005 248/37.3
(Continued)

*Primary Examiner* — William L Miller
(74) *Attorney, Agent, or Firm* — Wood Herron & Evans LLP

(57) ABSTRACT

The cookware system is created in a way that maximizes utensil storage while minimizing use of countertop space including for messy pots, pans, lids, knives, spatulas, tongs, cutting boards, and mixing bowls all within a compact device allowing immediate reach of anything you need without the inconvenience of stacking utensils or shoving them into various drawers and spacers.

10 Claims, 18 Drawing Sheets

(56) References Cited

U.S. PATENT DOCUMENTS

| | | | | |
|---|---|---|---|---|
| 6,394,565 | B1 * | 5/2002 | Greenhalgh | A47B 87/007 312/285 |
| 6,419,332 | B1 * | 7/2002 | Caldwell, Jr. | A47B 63/062 312/285 |
| 7,156,226 | B1 * | 1/2007 | Van Sickle | A47J 47/16 206/1.5 |
| 7,275,647 | B1 * | 10/2007 | Thompson | A47B 81/007 211/85.18 |
| 10,602,858 | B1 * | 3/2020 | Hunter | A47J 47/01 |
| 2001/0017508 | A1 * | 8/2001 | Caldwell, Jr. | A47B 63/06 312/305 |
| 2003/0034718 | A1 * | 2/2003 | Swenson | A47B 63/00 312/326 |
| 2003/0127405 | A1 * | 7/2003 | Heiner | A47F 5/02 211/163 |
| 2005/0236943 | A1 * | 10/2005 | Reo | A47B 49/004 312/285 |
| 2005/0274684 | A1 * | 12/2005 | Swanson | A47B 49/00 211/78 |
| 2006/0037921 | A1 * | 2/2006 | Weigel | A47B 81/007 211/74 |
| 2007/0056916 | A1 * | 3/2007 | Marano | A47B 49/00 211/10 |
| 2008/0011697 | A1 * | 1/2008 | Berg | A47B 49/00 211/10 |
| 2008/0290054 | A1 * | 11/2008 | Cass | A47J 47/16 211/70 |
| 2008/0297016 | A1 * | 12/2008 | Hsieh | A47B 49/004 312/249.2 |
| 2009/0212176 | A1 * | 8/2009 | Cass | A47J 47/16 248/125.8 |
| 2013/0233816 | A1 * | 9/2013 | Greenfield | A47B 49/00 211/13.1 |
| 2015/0305497 | A1 * | 10/2015 | Dolan | A47F 7/17 211/70.7 |
| 2016/0367026 | A1 * | 12/2016 | Hall | A47B 81/04 |
| 2017/0047754 | A1 * | 2/2017 | Fochs | B43M 99/008 |
| 2023/0380636 | A1 * | 11/2023 | Warren, V | A47J 47/16 |
| 2024/0016340 | A1 * | 1/2024 | Guerrero | A47J 47/005 |
| 2024/0074621 | A1 * | 3/2024 | Cheng | A47J 47/16 |

* cited by examiner

COMPACT COOKWARE AND UTENSIL STORAGE SYSTEM

This application claims priority to U.S. Provisional Application No. 63/340,208 filed May 10, 2022, entitled "Compact Countertop Cookware And Utensil Storage System," which is incorporated by reference herein, in its entirety. The disclosure herein relates to convenient solutions for storage and organization of cookware.

FIELD

Background

In recent surveys a majority of Americans have identified as being overwhelmed by the amount of stuff they have and need to store in their home, with more than 75% of respondents having no idea for how to more efficiently or more effectively store belonging. Post-pandemic trends also call for more minimalist uses of space, especially as it relates to the kitchen, and newer cookware sets or other kitchen tools. Increasingly, people are looking to upgrade items they interact with daily while removing unnecessary items.

The compact storage system and cookware set is disclosed herein that addresses these concerns. All of the essential utensils one needs for cooking are encompassed in the customizable and concise system. The device will not only significantly improve cooking experiences but also alleviate room limitations in small kitchens and kitchenettes in offices, breakrooms, homes, apartments, hotels, campers, recreational vehicles, and so forth. The cookware system removes clutter, which is crucial because kitchens are typically the second messiest spaces in a house aside from garages.

In particular, the compact cookware system addresses problems associated with kitchen drawers, cabinets, and spacers which have yet to be resolved. With an increase in time spent at home in the wake of global health challenges and ever-changing connectivity including remote work, the need is even greater for space management and cooking convenience. The creative compact cookware and utensil storage system will be appealing for a variety of applications and needs and provide value to everyday and specialized cooking needs.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have conceived of novel technology that, for the purpose of illustration, is disclosed herein as applied in the context of home and kitchen storage. While the disclosed applications of the inventors' technology satisfy a long-felt but unmet need in the art of home and kitchen storage, it should be understood that the inventors' technology is not limited to being implemented in the precise manners set forth herein, but could be implemented in other manners without undue experimentation by those of ordinary skill in the art in light of this disclosure. Accordingly, the examples set forth herein should be understood as being illustrative only, and should not be treated as limiting.

Figure 1:
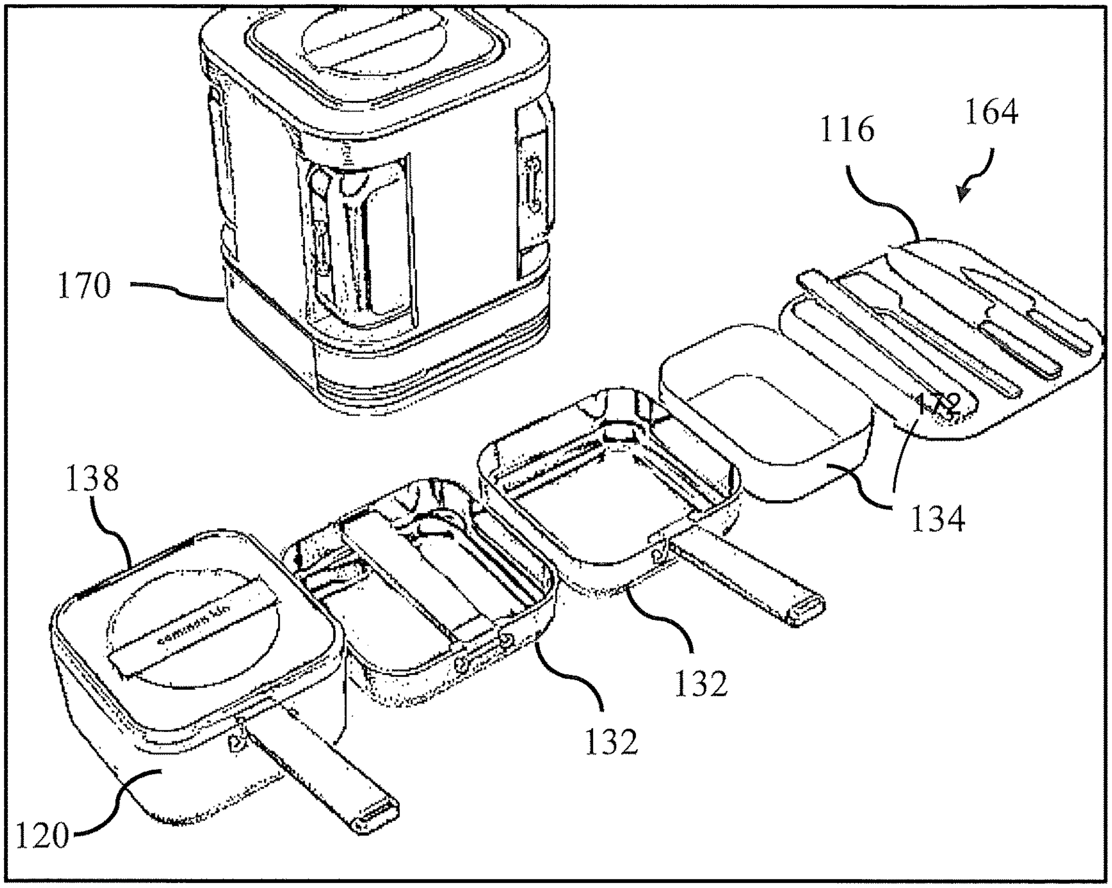
FIG. 1 shows a front perspective view of an exemplary compact storage device and related utensils.
Figure 22:
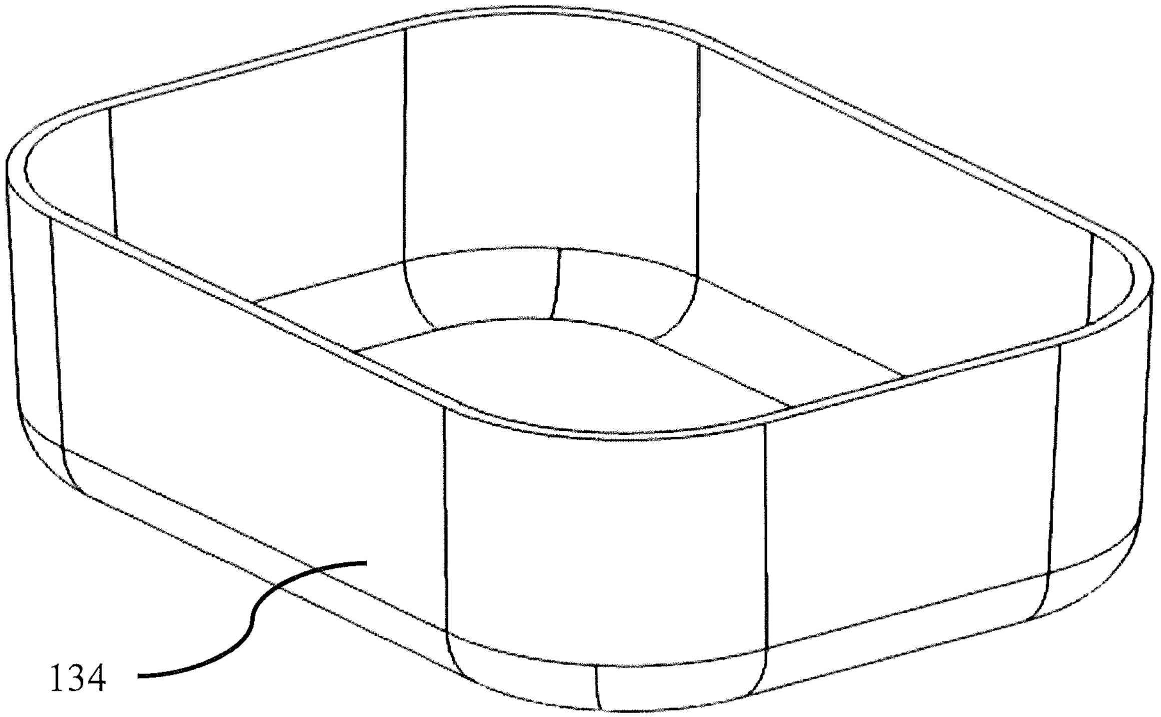
FIG. 22 is a perspective view of a baking dish that may be used and stored with the compact storage device.

FIG. 1 shows the compact storage device (170) and examples of storable utensils laid out in front including, from left to right, a pot (120) with a lid (138) on top, a pan (132) with handle folded in for storage, another pan (132) with handle folded out for cooking, a baking dish (134), shown in further detail in FIG. 22, and a variety of handheld utensils (164) such as tongs, spatula, knives, and so on, arrayed upon a cutting board (116).

Figure 2:
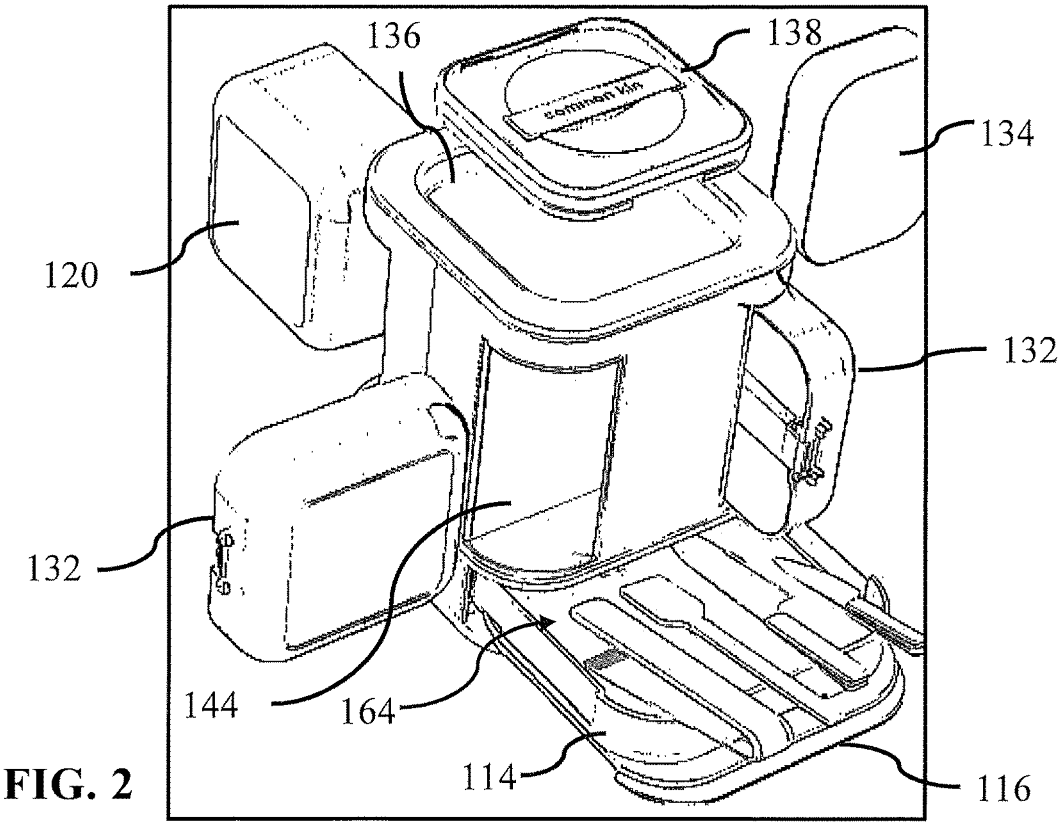
FIG. 2 shows a front perspective view of the compact storage device with utensils positioned proximate to their storage location.

FIG. 2 shows the compact storage device (170) with storable utensils arranged proximate to their location of storage within the device (170) to illustrate where they may be inserted or removed from, including a pot (120), two pans or skillets (132), and a baking dish (134) which may be stored within four cubbies (144) that define vertically aligned storage slots about the device (170), a lid (138) stored within a lid holder (136) within the top of the device (170), a set of utensils (164) that may be stored within a utensil drawer (114), and a cutting board (116) that is storable in a slot below the utensil drawer (114). In some implementations, as will be illustrated in more detail below, the cavity defined by the lid holder (136) may provide access to additional storage within the center portion of the device (170).

Figure 3:
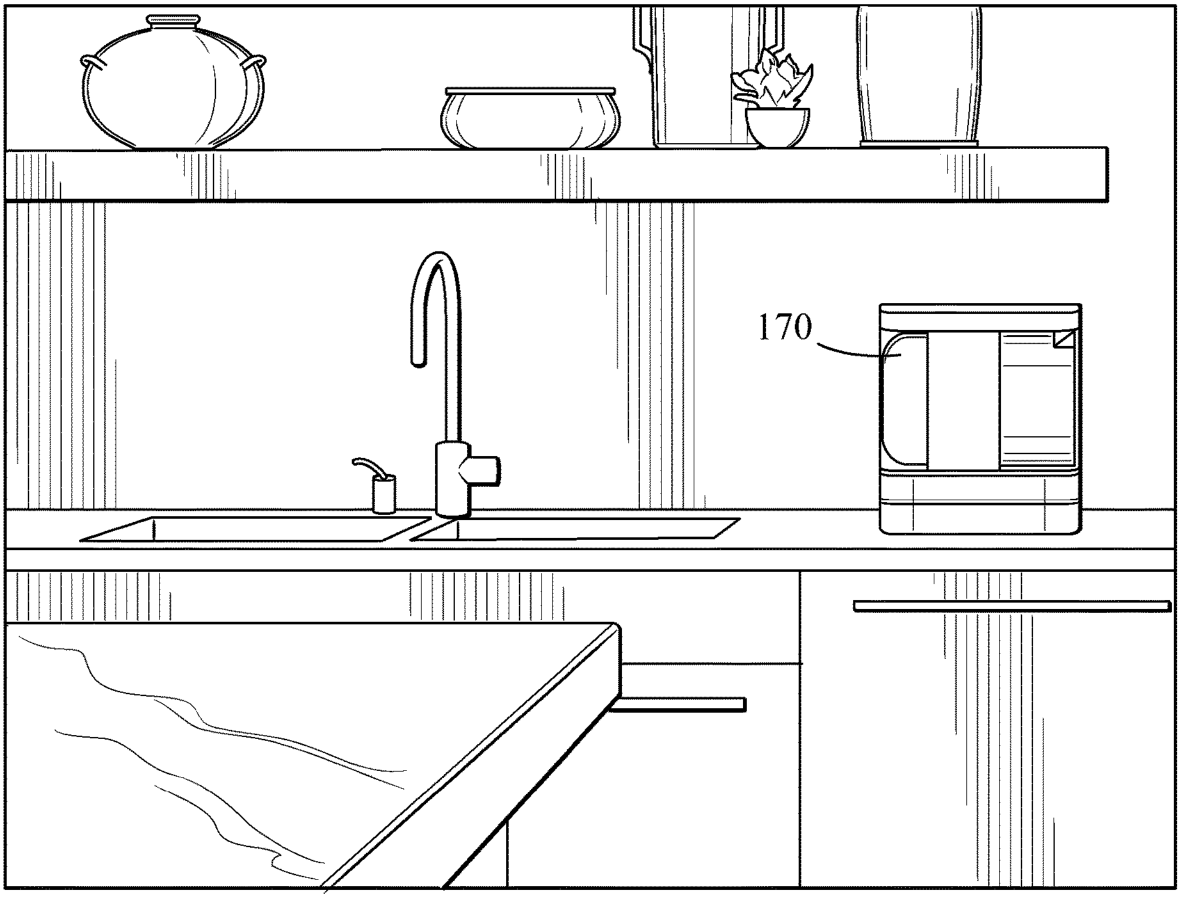
FIG. 3 illustrates the compact storage device of FIG. 1 within a kitchen environment.

FIG. 3 shows the storage device (170) in chrome in a typical kitchen setting, such as in an apartment or other small kitchen setting where space is limited and illustrates that the dimensions of the device (170) allow for convenient placement on a countertop or under a kitchen cabinet for easy storability and accessibility. After observation of the homes of friends and family, the need was clear for a more efficient and compact cookware and utensil storage system. Pots, pans, and the like are often over-purchased and underused, while taking up clutter and adding messiness to already limited spaces. FIG. 3 further illustrates the size of the device (170) as being comparable to the size of a mixer or coffee maker that fits easily onto a kitchen counter or below the counter in a kitchen cabinet, for instance.

Figure 4A:
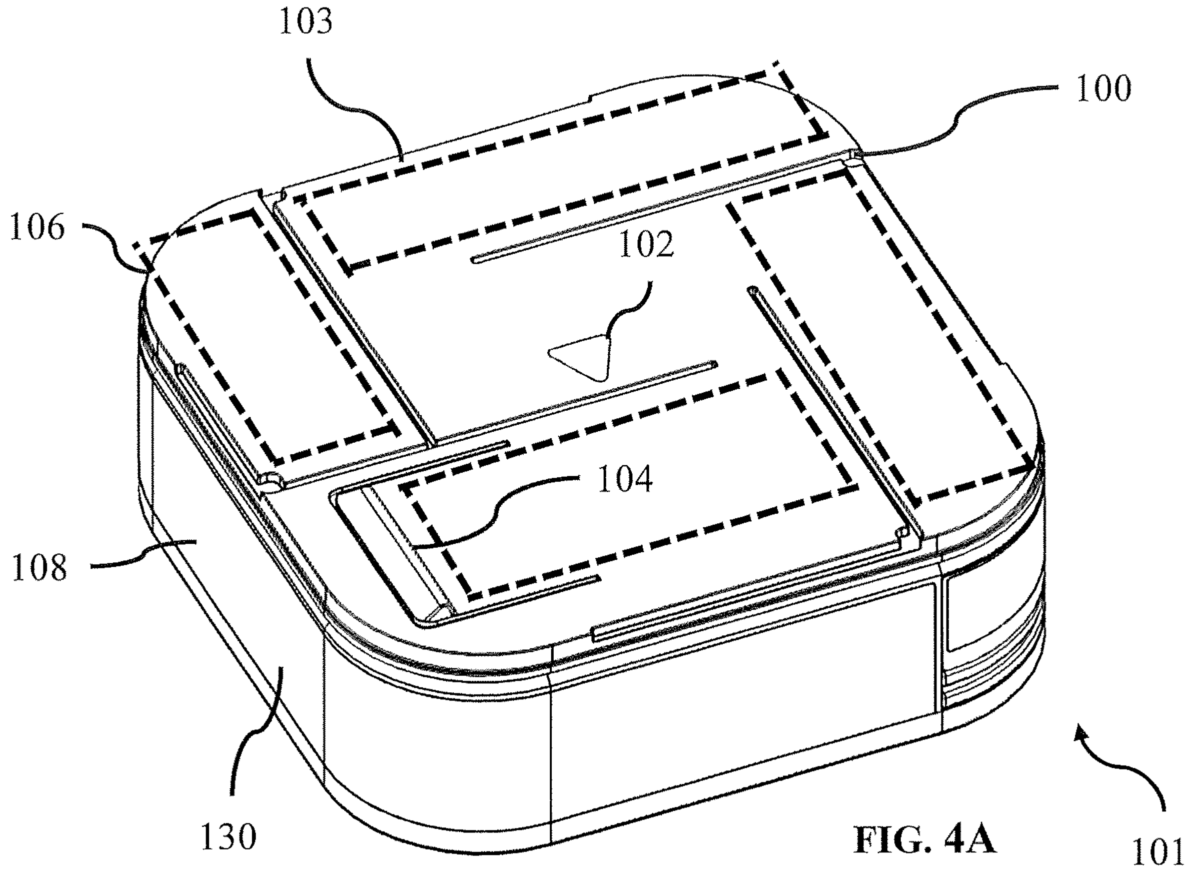
FIG. 4A shows a front perspective view of a base of the compact storage device, with some upper portions removed to illustrate components of the base.
Figure 4B:
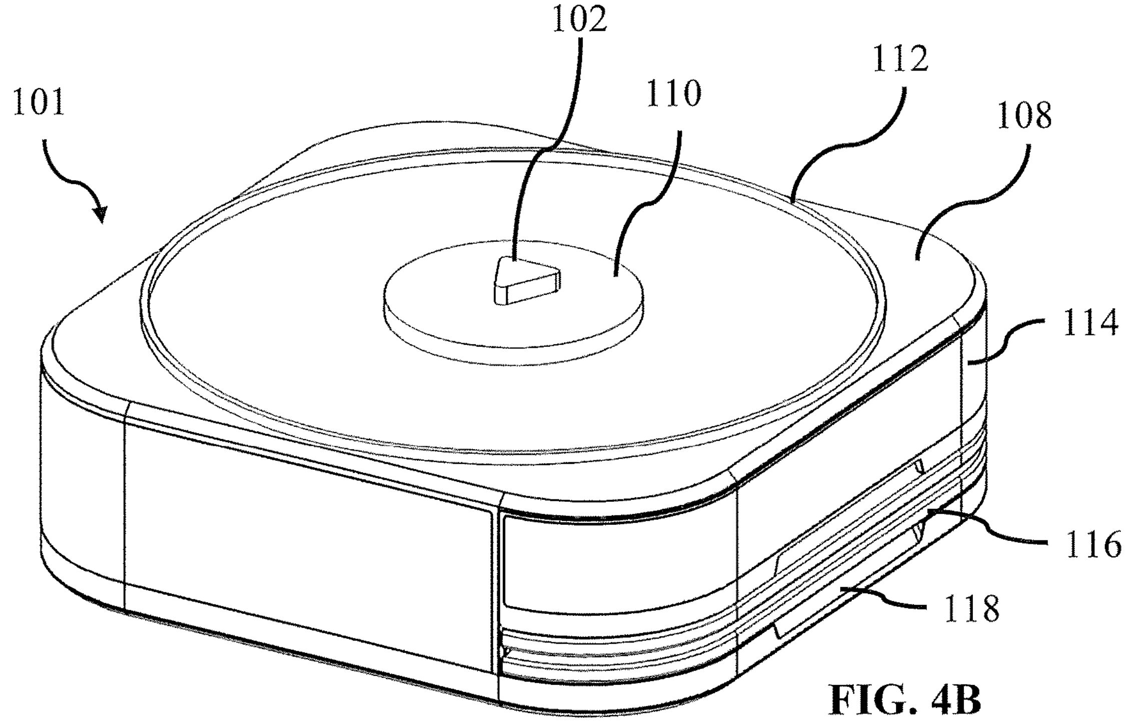
FIG. 4B is a side perspective view of the base, with some upper portion removed to illustrate components of the base.

FIG. 4A shows a base (101) of the device (170), with other components removed for visibility. The base (101) includes smooth edges (130) and curved corners (106), and a set of linear slots (100) are arranged on the surface of the base (101) and configured to receive divider walls, as will be illustrated in more detail below. The approximate storage locations of pots, pans, and baking dishes that may be stored by the device (170) are illustrated as dashed lines. One or several retention ramps (104) may be provided on the surface of the base (101), and provide a mechanical, flexibly biased retention mechanism to hold stored utensils within their storage slot. As a pot or other item is inserted into its storage location, the angled front edge of the ramp (104) is depressed into the base (101) by the leading edge of the pot, and once the pot is fully inserted the flexibly biased ramp (104) springs back to its original position. The back side of the ramp (104) may be a 90 degree flat edge, or may have a steep angle such that it provides some resistance to removing the pot, and such that it retains the pot in place to prevent unintentional removal. A swivel tab (102) is positioned at the center of the base (101) and allows the upper portion (103) of the base (101) to rotate independently of the lower portion (108), as depicted in FIG. 4B and FIG. 5. The retention ramp (104) may be made from plastic, metal, rubber, or other appropriate materials that will provide a degree of flexibility biased towards an original position. Other retention mechanisms may also be utilized, and may include magnets, hand actuated lock and release mechanisms, and so on.

FIG. 4B is another view of the base (101), with the upper portion (103) removed to show the swivel tab (102) and related components. FIG. 4B also better illustrates two cutting boards (116) stored within cutting board slots within the lower portion (108), and a drawer for utensils (114). The drawer (114) and cutting board (116) storage slots may each have handle cutouts (118) for easy opening and closing (118). The swivel tab (102) can be seen extending from a rotatable plate (110), while an outer rail (112) of the swivel mechanism provides support for smooth rotation while the device (170) is fully loaded with stored utensils. The purpose behind this unique design choice is to enable one to locate utensils with ease at every corner without having to reach or stack utensils elsewhere. The lower portion (108) of the base (101) includes drawers for holding two cutting boards (116), which may include a thicker and thinner cutting board, or two cutting boards of equal size, and a utensil drawer (114) for holding knives, tongs, spatulas, and other handheld tools.

Figure 5A:
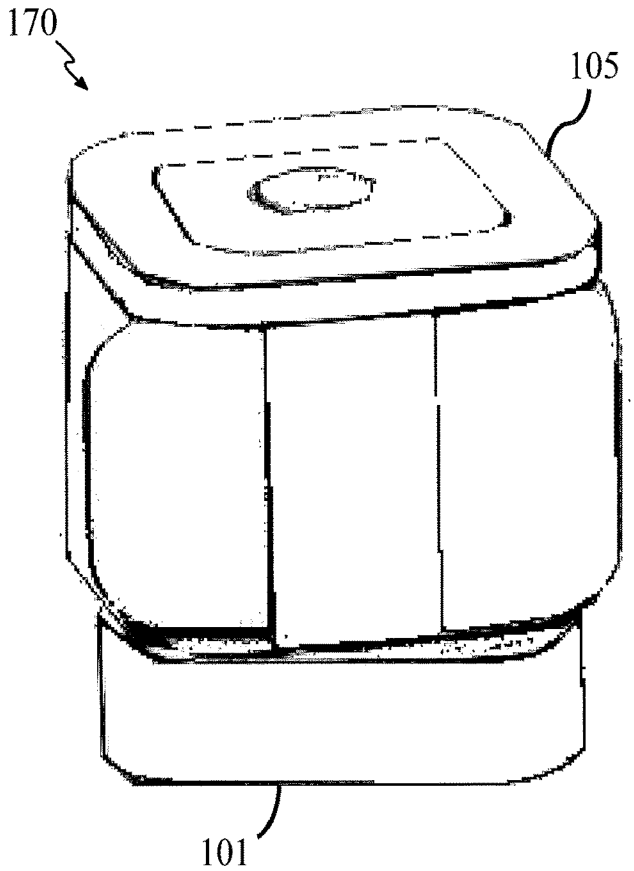
FIG. 5A shows another side perspective of the component storage device.
Figure 5B:
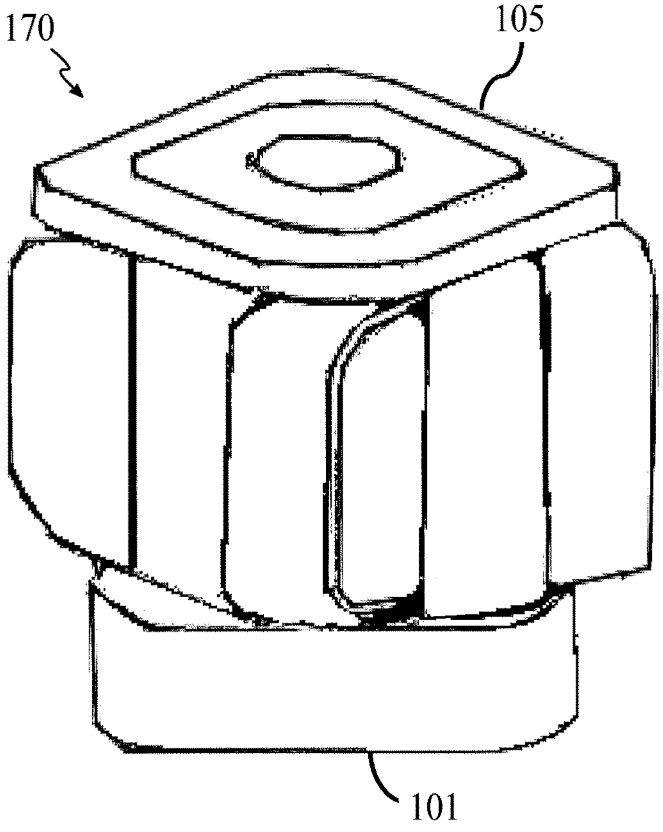
FIG. 5B is a side perspective similar to FIG. 5A, but with the storage compartment rotated relative to the base.

FIGS. 5A and 5B illustrates the operation of the swivel system, allowing total rotation of a pot storage compartment (105) of the device (170), relative to the base (101) which remains immobile, such that any pot, pan, baking dish, etc. may be easily accessed while cooking by rotating the storage compartment (105). After examination and research, it has been determined that it may be desirable for the system to limit stacking in favor of rotation with a focus on accessibility and ability of each piece to hang up or slide freely. Thus, the embodiment with swiveling storage having pots and pans vertically aligned on the sides of the cube-like system and pressing each into the sides of the box to pull them out as needed has been determined to be a viable alternative to stacking storage. The improved design of the swivel mechanism is shifted to balancing the weight of pots and pans to allow for smooth and controlled rotation even while fully loaded with cookware.

As has been described, the swivel feature allows pots and pans to be stored in side corner shelving spaces (144) with a lid (138) stored by the device (170), and space on the bottom for a utensil drawer (114) and slide-in cutting board (116), as can be seen in FIG. 2. In some implementations, the storage device is configured to store various utensils within the utensil drawer including a universal pot and pan lid considering storage with handles. In an alternative implementation, a universal handle may be stored within a pot or pan itself, optionally inside of the shelving unit. The utensil drawer (114) and cutting boards (116) may slide out along a horizontal axis, as illustrated by FIG. 2. Various modifications to the cutting board are possible, for example to save space the cutting board can be made thin to accommodate several cutting boards, or may be made thicker to provide one or two more durable cutting boards.

Figure 6:
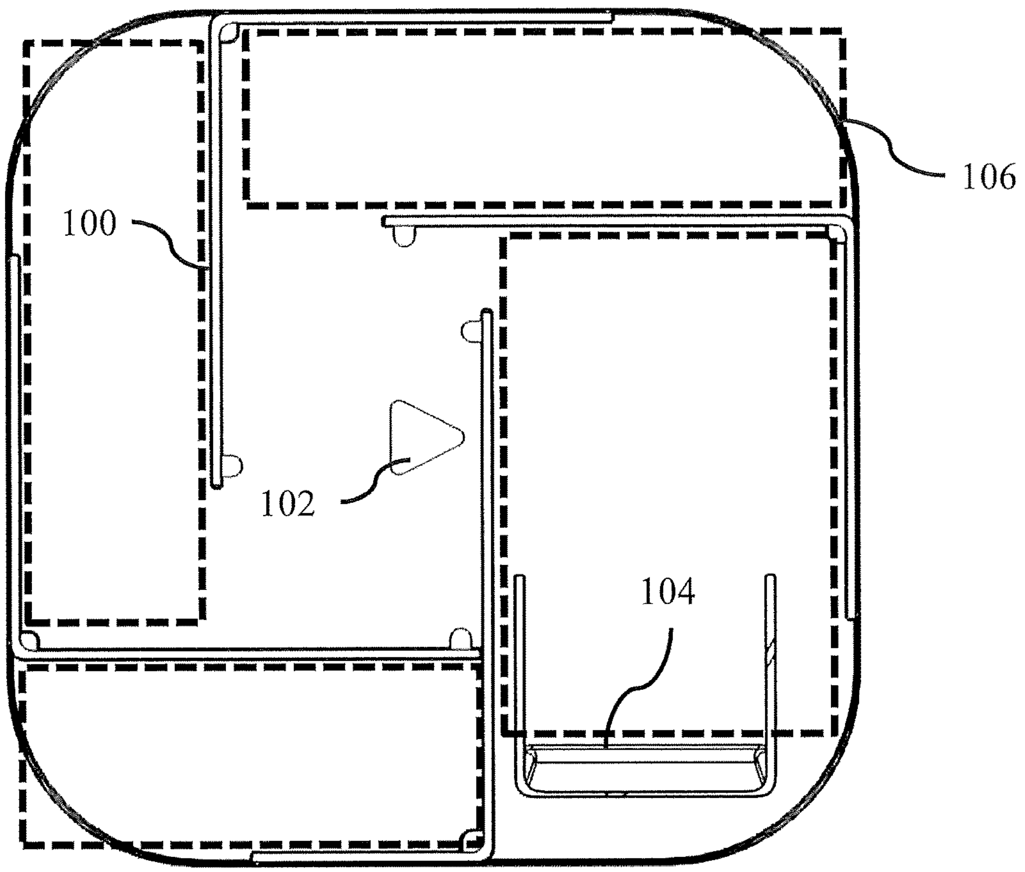
FIG. 6 is a top-down view of the base of FIGS. 4A and 4B.

FIG. 6 is the top down view of the linear slots (100) and retention ramp (104) on the surface of the lower portion (103) of the base (101) to show carefully designed arrangement to hold essential cookware of various shapes and sizes, and enable 360° swivel (102) to access cookware while cooking. As with the prior example, the storage locations for pots, pans, and other cookware relative to the base (101) are illustrated by dashed lines.

Figure 7:
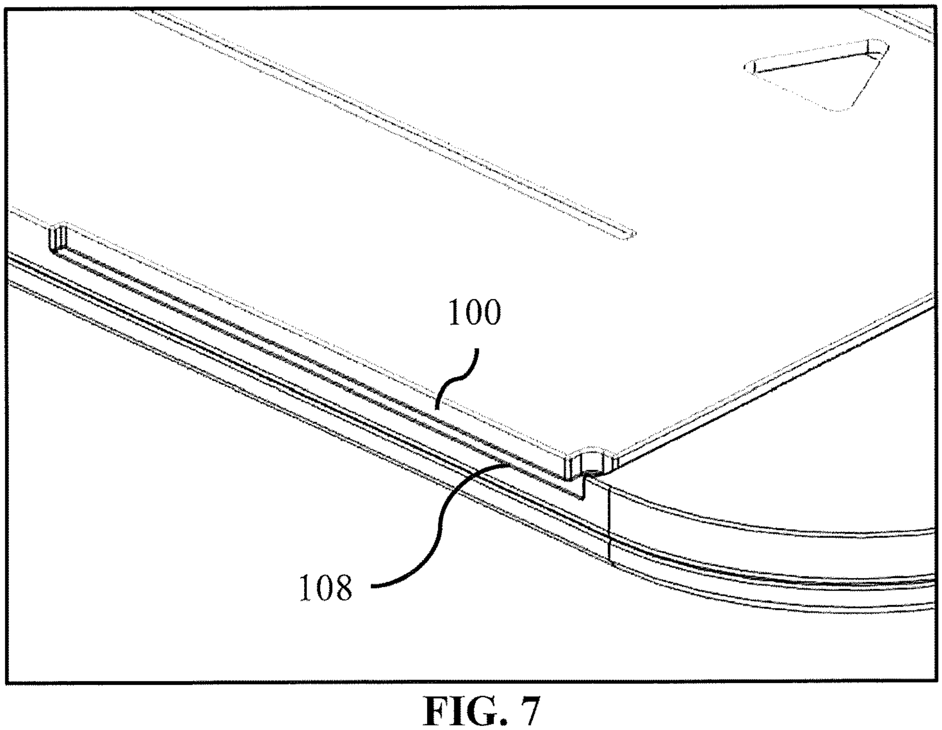
FIG. 7 is a magnified view of an edge of the base of FIGS. 4A and 4B.

FIG. 7 shows a magnified view of an edge of the base (101), where it can be seen that the linear slot (100) is formed by the attachment of a surface-layer that includes a cutout defining each slot, to a sub-layer defined by the lower portion (108) of the base. This attachment can be made in varying ways, and may include various mechanical fits such as a lock and key arrangement of tabs, or may be adhered together, molded or welded together, and so on. By forming the slots (100) on the surface of the base (101) from two distinct layers, the slots (100) may be defined in a way that reduces the complexity of the parts and manufacturing processes, as compared to a single layer with slots added by etching or machining. The arrangement of divider wall slots is shown in FIG. 6 in a top-down view, highlighting again the ramp (104), divider wall slots (100), and swivel tab (102) in the center.

Figure 8:
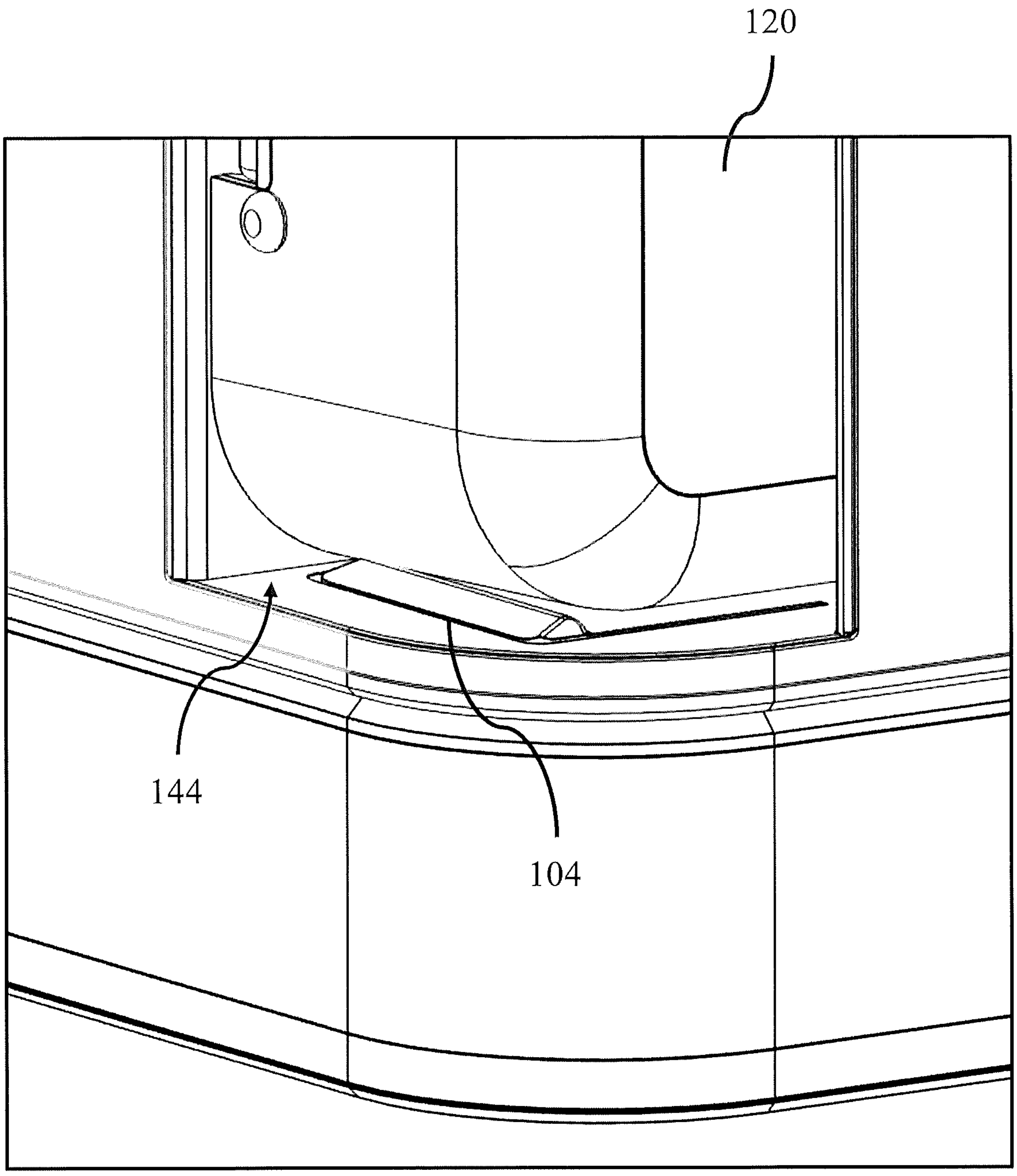
FIG. 8 is a magnified view of a pot stored within a cubby of the compact storage device and held in place by a retaining ramp.

FIG. 8 is a closeup view of a pot (120) after insertion past the retention ramp (104), such that it is retained within the cubby (144) and fastened into the cubby hole created by arrangement of divider walls to house cookware. A related discovery during implementation of the storage device is that metal may not be the most suitable material for all components. Metal-on-metal rubbing can cause scratches when pushing pots and pans and mixing bowls and the like into a storage position of the storage device (170), so in some implementations the interior of storage cubby (144) is formed of or lined with plastic or other materials that are less likely to cause scratches to pots and pans.

It was also determined that a drawer with complex mechanical railings may not be desirable, for purposes of usability and ease of manufacturing, and so some implementations instead favor a set of guides or tabs that the drawer (114) or cutting boards (116) rest upon when inserted. Another related feature is a push and pop capability for the pots and pans that may be particularly desirable to users, as a pot or pan may be mechanically affixed in place within a storage position as it is inserted, and retained by the ramp (104), which may be formed of a flexible plastic or other biased material, or alternatively may include a spring bias or other mechanism, that allows the ramp (104) to be displaced by the pot upon insertion, but provides some resistance to removing the pot to prevent accidental or unintentional removal. To show the impact of the placement of divider wall slots and other pieces for housing cookware, as well as how the ramp works, FIG. 8 exhibits a pot (120) in its corner cubby held by the ramp (104).

Figure 9A:
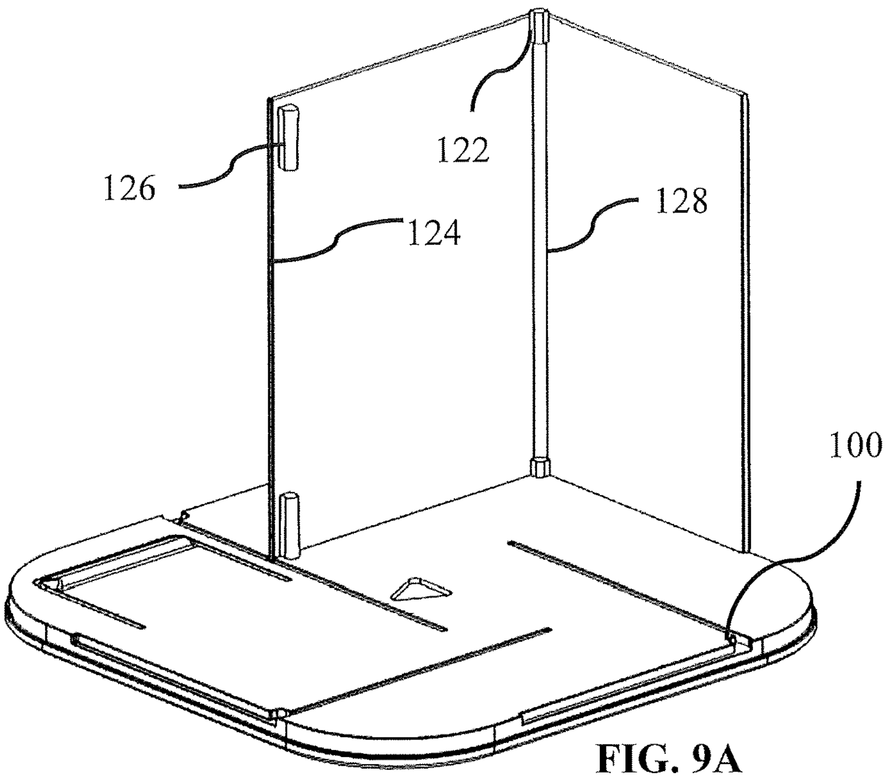
FIG. 9A shows a divider slot layer of the base with a single divider wall installed, and other divider walls removed for visibility.
Figure 9B:
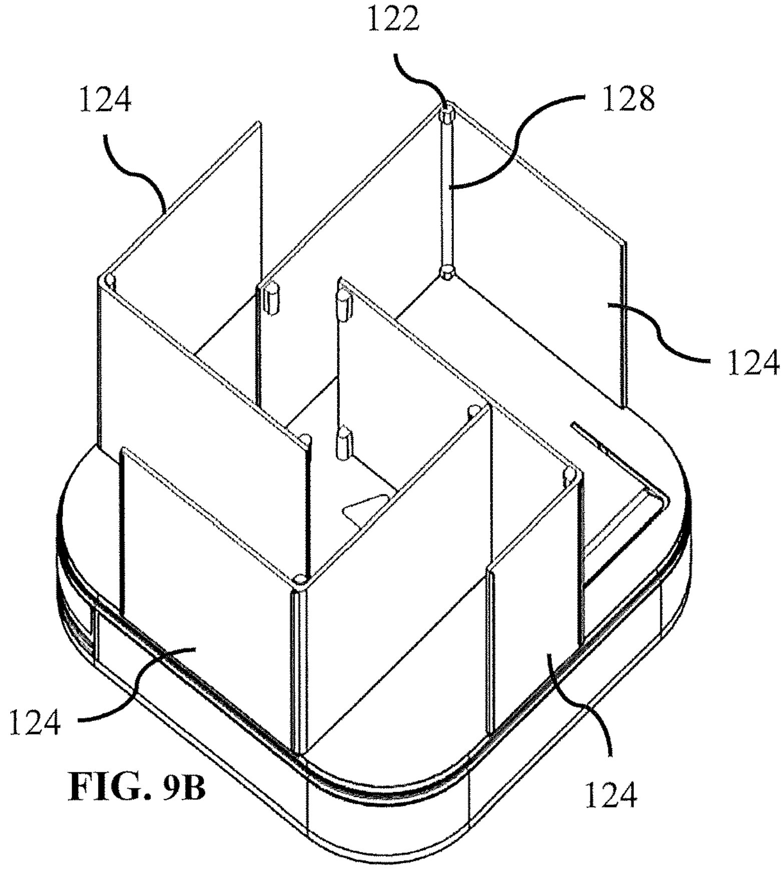
FIG. 9B is a top perspective view of the base with four divider walls installed in the divider slot layer.

FIG. 9A illustrates a single divider wall (124) placed into a corresponding slot (100) in the base (101), with vertical orientation, such that the longer wing faces inwardly into the base frame. Each divider wall (124) may include tabs (126, 122) at the top and bottom of the wall that fit within the corresponding slot (100) and provided improved rigidity and stability. Each face of the divider wall (124) may be coupled together by a vertical retainer (128) that each face fits within to form the right-angle arrangement depicted. A complete arrangement of all four divider walls (124) is shown and described below in the context of FIG. 9B. Once cookware (pot (120), pans (132), mixing bowl/baking dish (134), etc.) are inserted into cubbies (144) defined by the divider walls (124), they are positioned vertically in an easy to reach arrangement, and the utility of the storage device becomes more apparent, as illustrated by FIG. 10A.

Figure 10A:
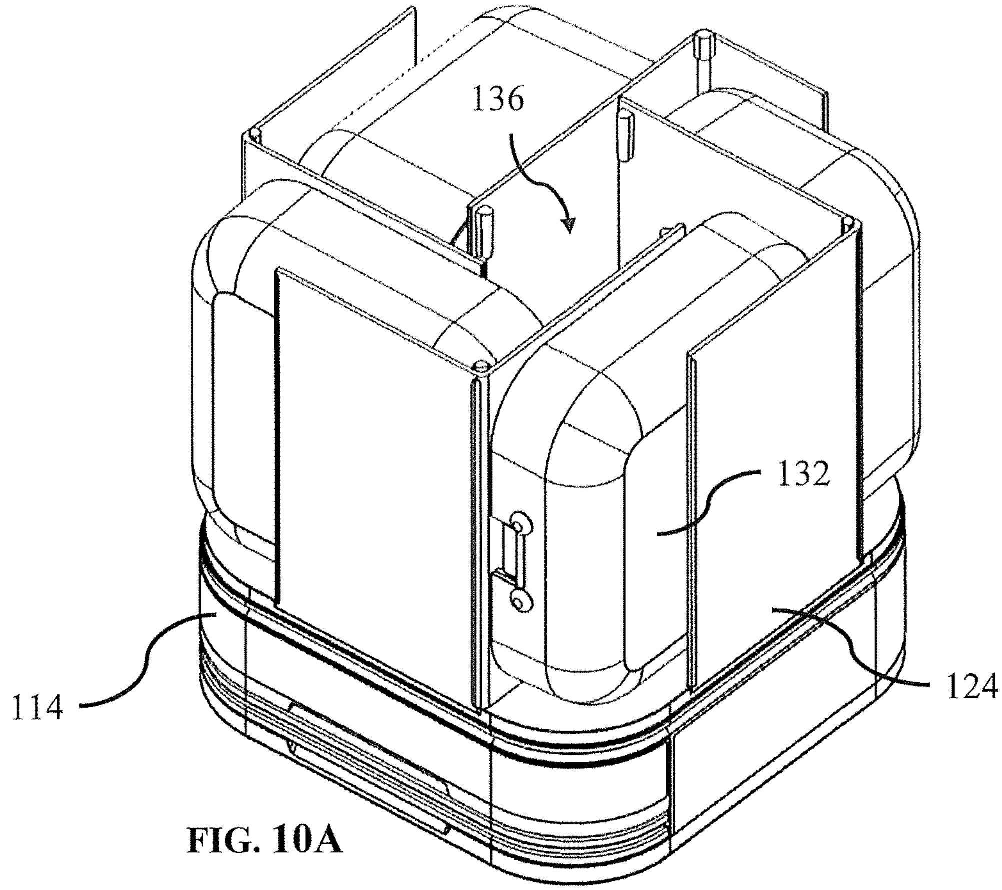
FIG. 10A shows the view of FIG. 9B with several kitchen utensils situated within storage areas defined by the divider walls.
Figure 10B:
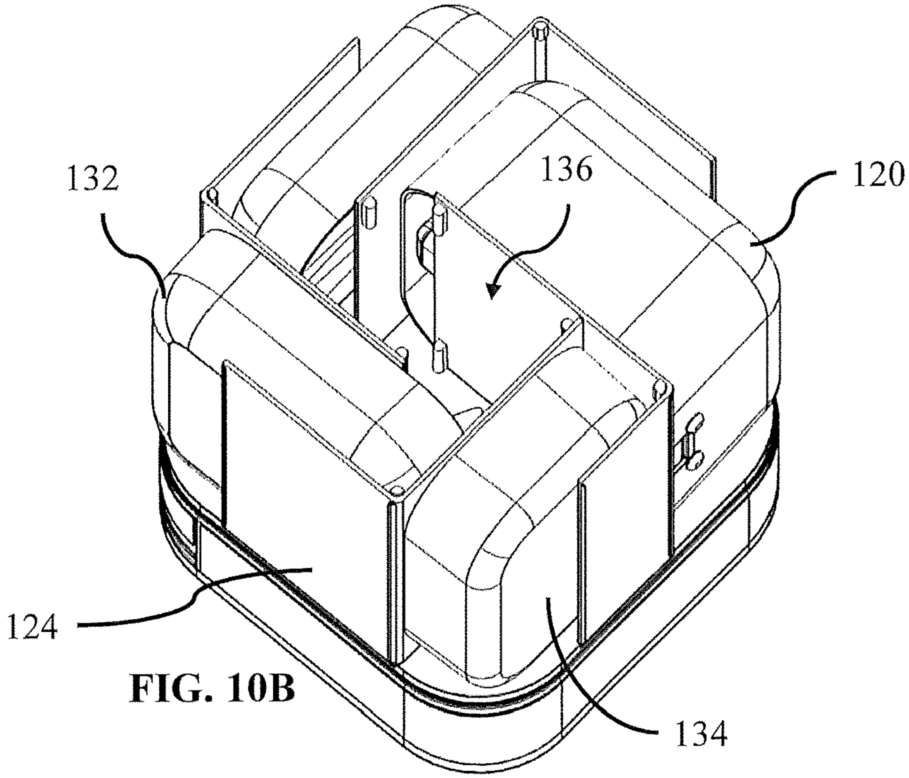
FIG. 10B shows the view of FIG. 10A from an alternate perspective where a middle cubby hole proximate to the center of the compact storage device is visible.

FIG. 10A shows the device (170) with some portions of the storage compartment (105) removed to illustrate the arrangement of divider walls (124) and positioning of pots therein. FIGS. 10A and 10B each show an interior space accessible via the lid holder (136) that may be utilized as an additional cubby storage. FIG. 10B shows another top perspective view of the system with pots (120), pans (132), etc. between the divider walls (124) exhibiting the various sizes and configurations, as well as the cubby hole in the middle accessible via the lid holder (136).

Figure 11:
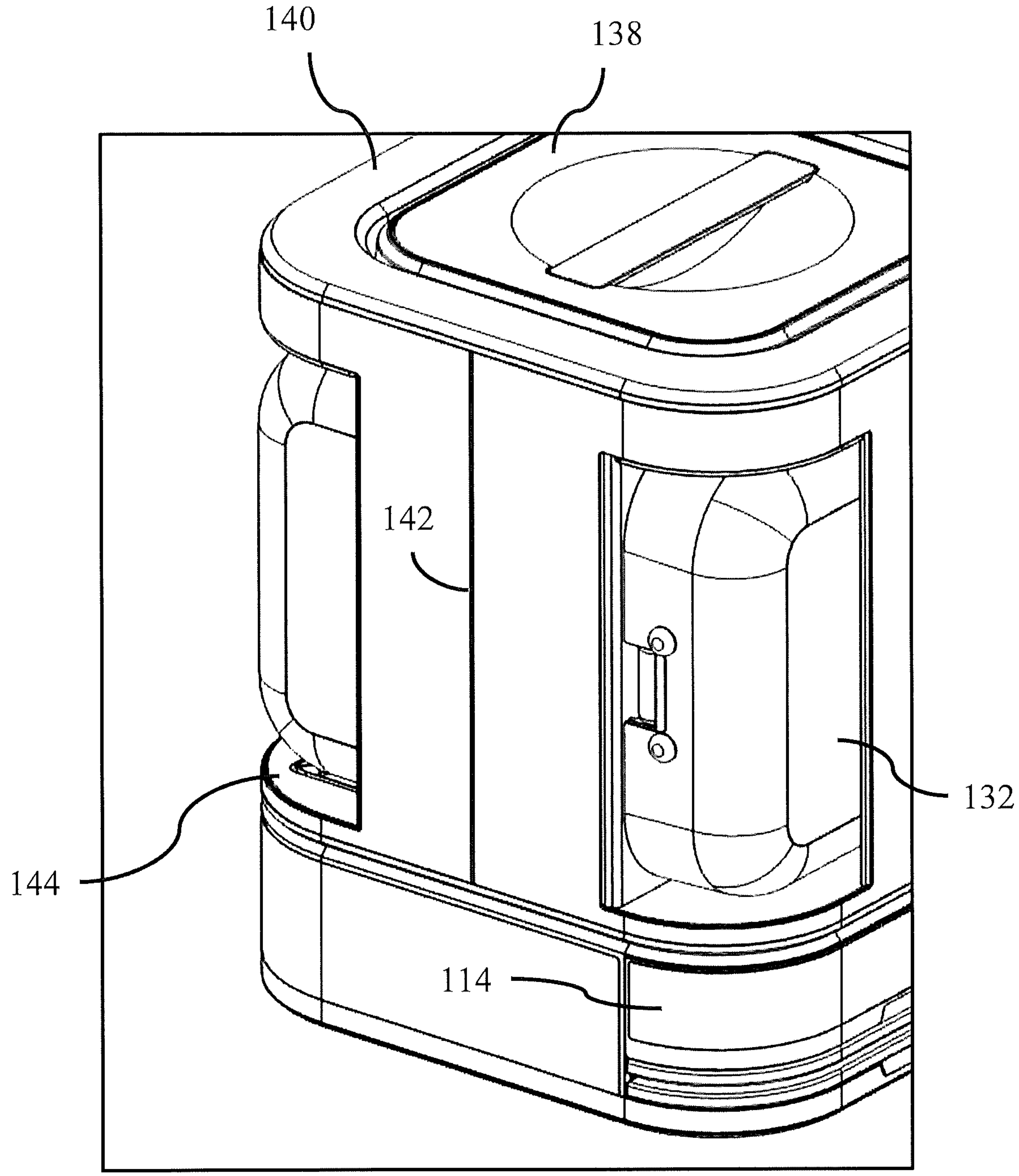
FIG. 11 is a perspective view of the compact storage device, highlighting a sheath that wraps an exterior of the compact storage device.

FIG. 11 is a view of a sheath (142) wrapped around the exterior of the storage compartment (105), leaving a seam line down the center of exterior wall facing outward where each edge of the sheath (142) meet. The sheath (142) may be formed of metal, plastic, or other materials that provide a desirable aesthetic as well as a durable cover for the device (170). The sheath (142) vertically covers the sides of the storage compartment (105) with cutouts for each cubby (144). When assembling the device (170), a top frame (140) may be fitted onto the top edges of the divider walls (124), which themselves are fit within the base (101). While this assembly will have some structural rigidity when assembled with mechanical connections (e.g., friction fit, interlocking tabs, etc.), the device (170) is made far more durable and rigid when the sheath (142) is wrapped around the exterior edge, with the upper edge of the sheath (142) wrapping the top frame (140), and the lower edge of the sheath (142) wrapping the upper portion (103) of the base (101). This allows for ease of assembly, avoiding the use of adhesives or other more permanent couplings, and also allows the sheath (142) to define a clean aesthetically appealing exterior, since the sheath (142) covers and hides the divider walls (124) which may be typically made of unfinished plastics or other materials.

Figure 12A:
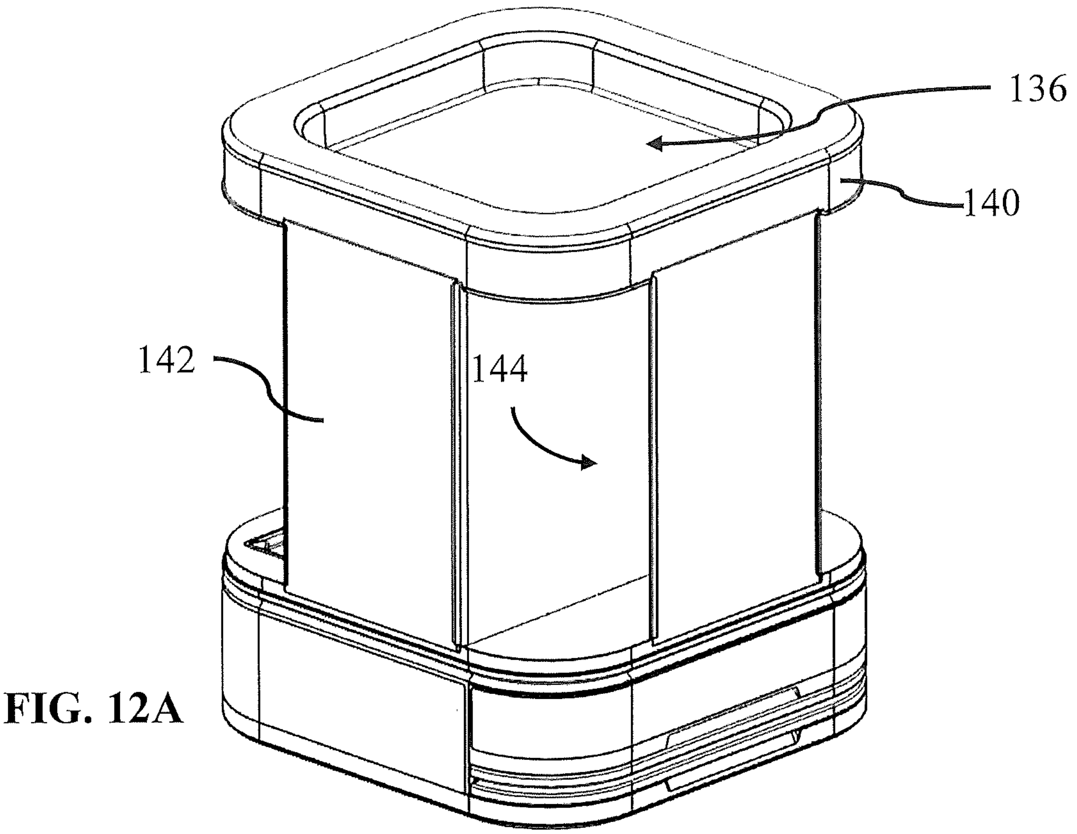
FIG. 12A is a perspective view of the compact storage device with the sheath of FIG. 11 removed to show additional components of the compact storage device.

FIG. 12A is an isometric view of the device (170) with the sheath (142) removed. Without the sheath (142) in place, the unfinished edges of the top frame (140), upper portion (103), and divider walls (124) is exposed, and the devices overall rigidity is reduced since each of those components are fit together with non-permanent couplings (e.g., such as friction fit or other mechanical couplings). The figure also illustrates a set of empty cubbies (144) for housing pots, etc. that creates a sturdy box frame with top lip piece of the top frame (140) attaching into place to hold the divider walls and sheath (142) firmly between the top and base of the frame, and again showing the possible cubby hole in the middle which can be closed off (136). In some implementations, plastic materials may be used for the core of the product, allowing it to be lightweight, easily manufacturable, and easily movable from spaces like countertops. The system may also created and assembled from separate parts. The bottom base, FIG. 4A, the shelving core (136) and cubby holes (144) in FIG. 12A, and the top portion where the lid is housed may each me manufactured separately and easily assembled by the manufacturer or the end customer, as may be desired.

All three of these key pieces come together seamlessly for a solid system structure that remains lightweight and beautiful in design. Different metal plating has been additionally added to the structure and these are simply cosmetic to help create a product that is user-friendly and favorable to users. The overall space taken up by the system is relatively small, as illustrated by FIG. 3. This is made possible in part by using square shapes for the pots, pans, bowls, and optionally for utensils generally with squared dimensions of about 8 inches by 8 inches. Additionally, the minimum amount of material used for the cookware and utensils results in a system that is of relatively low weight. FIG. 12A further illustrates the structure with cookware taken out.

Figure 12B:
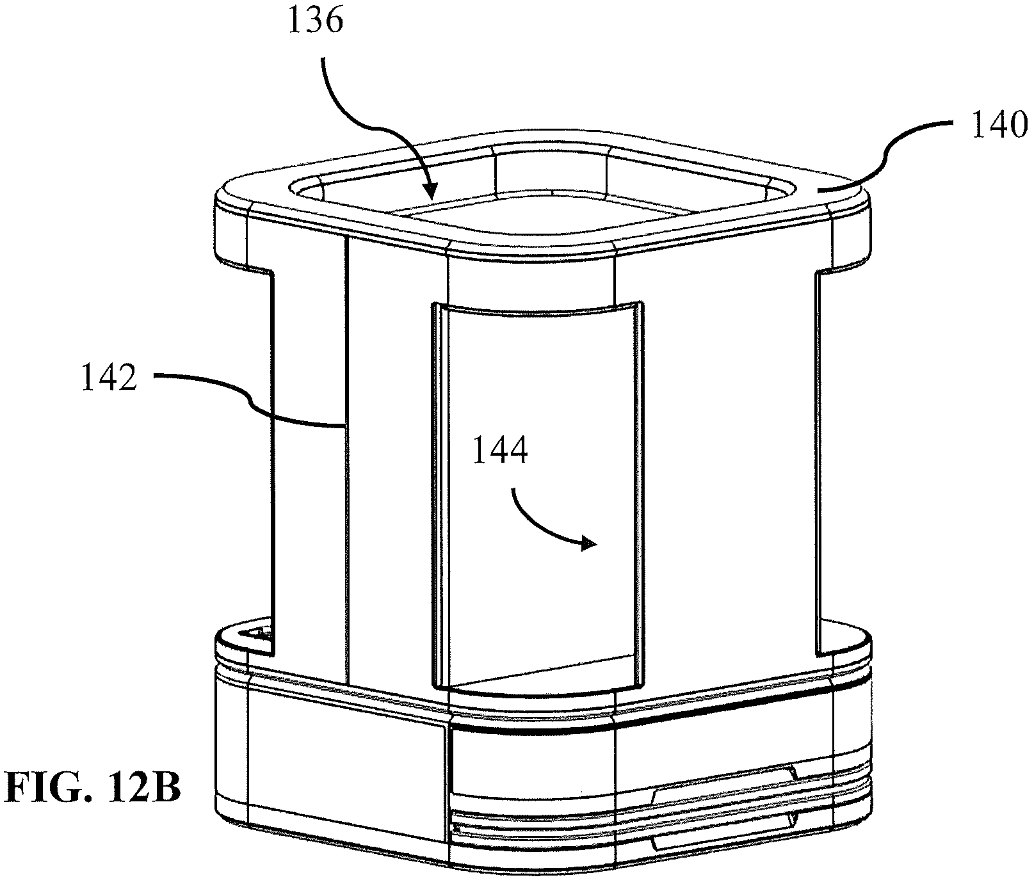
FIG. 12B is a perspective view of the compact storage device similar to that of FIG. 12A, with the sheath installed in place.

FIG. 12B is a side view of showing the seam where the sheath (142) meets on the exterior of the device (170). The system has the metal sheath (142) around the middle to hold cookware and the divider walls securely into place, the cookware fits into the cubby holes defined out by the divider walls and sheath (144), which are locked between the base and top frame with the top frame lip (140), as illustrated in FIG. 12A. This also shows a possible cubby hole in the center of the device (136), here closed off, and the utensil drawer as stationary in the base frame (114). The top of the frame (140) locks, snaps, clicks, is magnetized, or in such ways attached to the top of the structure at its corners.

Figure 13:
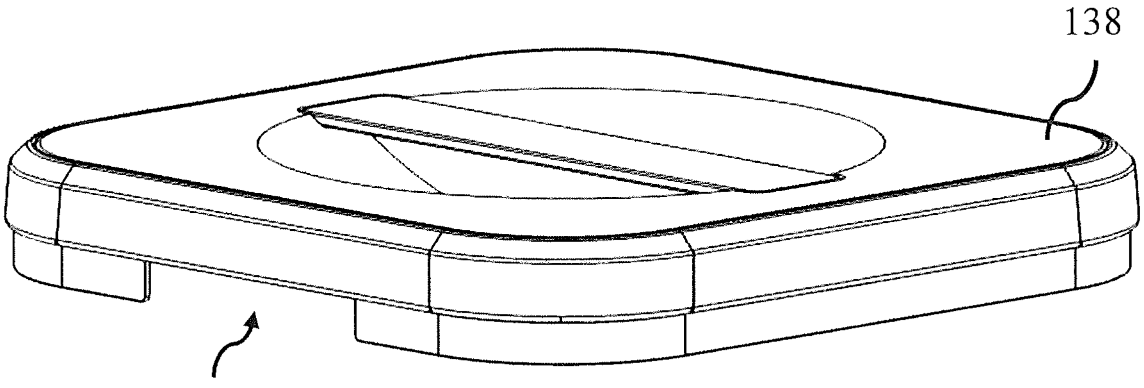
FIG. 13 is a perspective view of a detachable and movable lid of the compact storage device.
Figure 14:
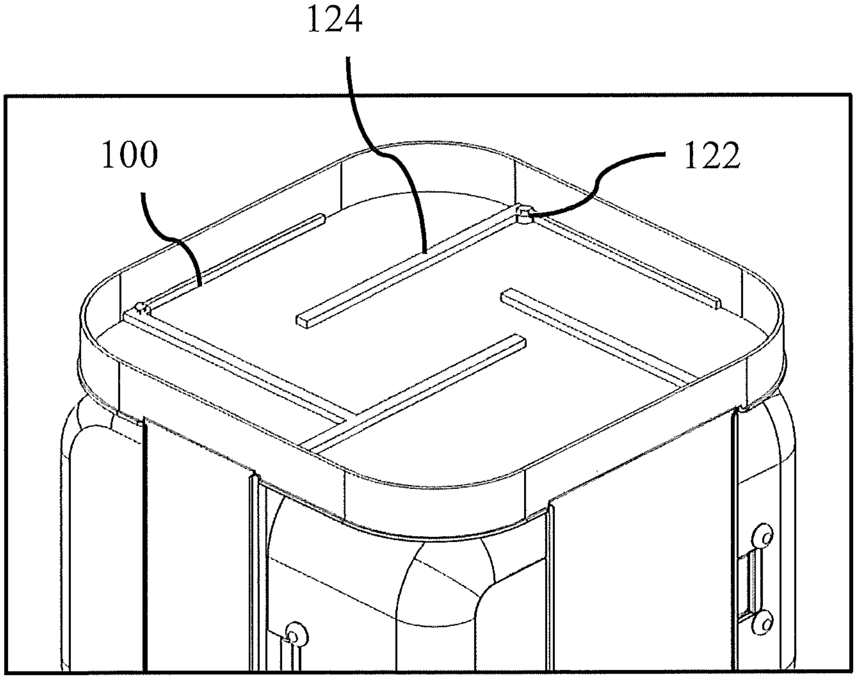
FIG. 14 is a top perspective view of the compact storage device with the detachable and movable lid removed, illustrating a set of divider walls in place within a top frame of the compact storage device.

FIG. 13 is a perspective view of the detachable and movable lid (138) that is situated in the lid holder (136) of the top frame (140), and that is capable of fitting onto each pot, pan, etc. with a cutout (146) that aligns with the place for the handle on the cookware. The lid (138) has a handle to be easily moved around between the top frame and each of the cookware. The lid has a cutout portion (146) for fitting on the cookware over the handle. The detachable lid can be moved between any of the pots and pans, specifically. FIG. 14 illustrates the storage device with the top layer with the lid removed from the top of the structure, which shows the divider walls locked into place (100) in the top frame (140), with a surface layer of the top frame including the divider wall (124) tabs (122) that hold the faces of the divider wall (124) together, and stabilize within the respective upper and lower linear slots (100).

Figure 15:
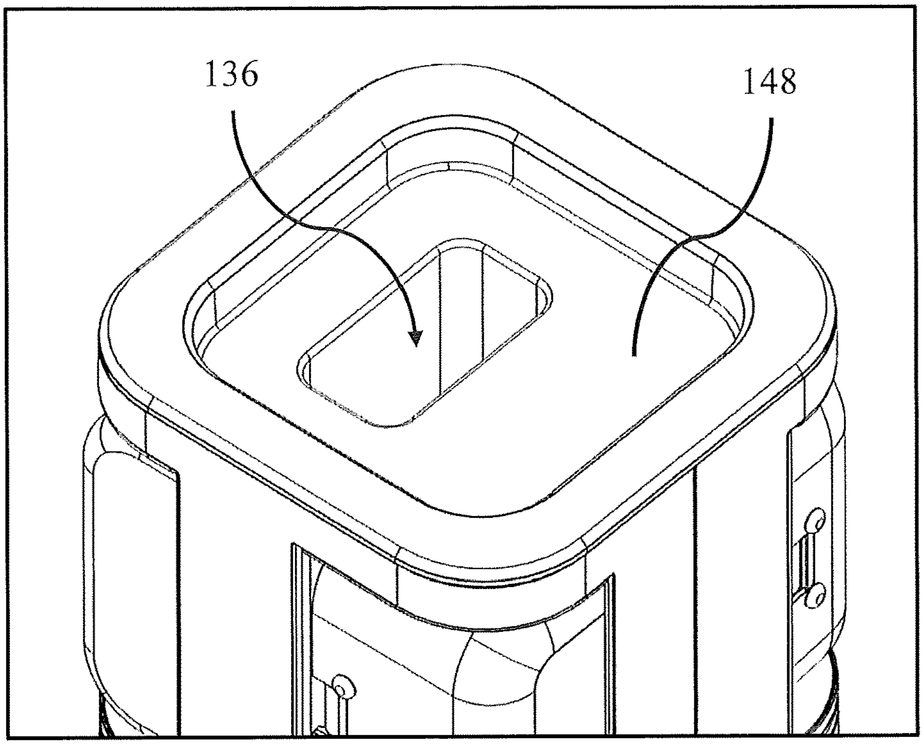
FIG. 15 is a perspective view of the compact storage device with the top layer of removed to show a central cubby hole.

FIG. 15 shows a top perspective view of the device (170), without the lid (138), showing the hollow center "cubby hole" (136) in the center (not closed off) where the layer (148) has a cutout for the cubby hole, and the layer below this feature is the one that holds the divider walls into place, allowing additional storage without interrupting the function of the swivel feature; and this also features a view showing where the single wrap-around sheath connects (142). Extra storage could be used for utensils, a knife sharpening tool, etc. The entire top frame with all layers underneath is of course capped with the lid (138).

Figure 16:
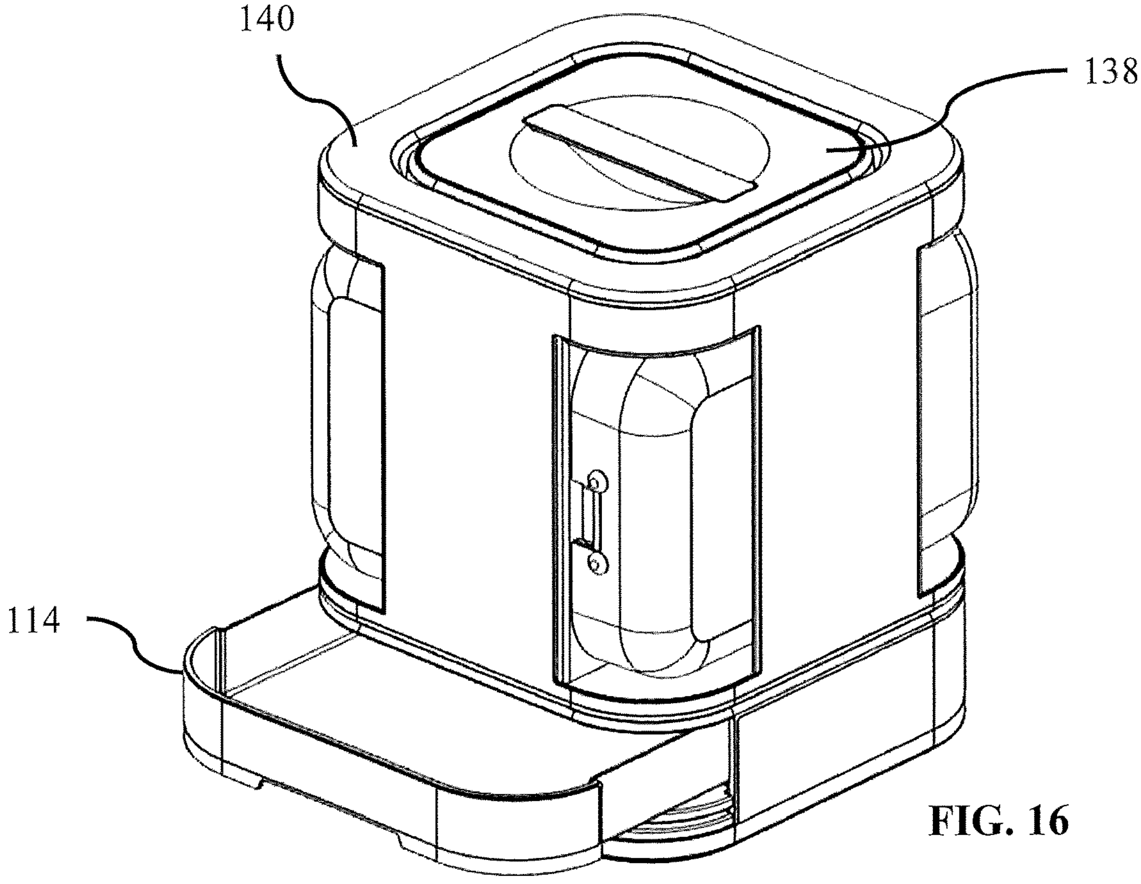
FIG. 16 is a perspective view of the compact storage device with a utensil drawer opening and extending from the base.
Figure 17:
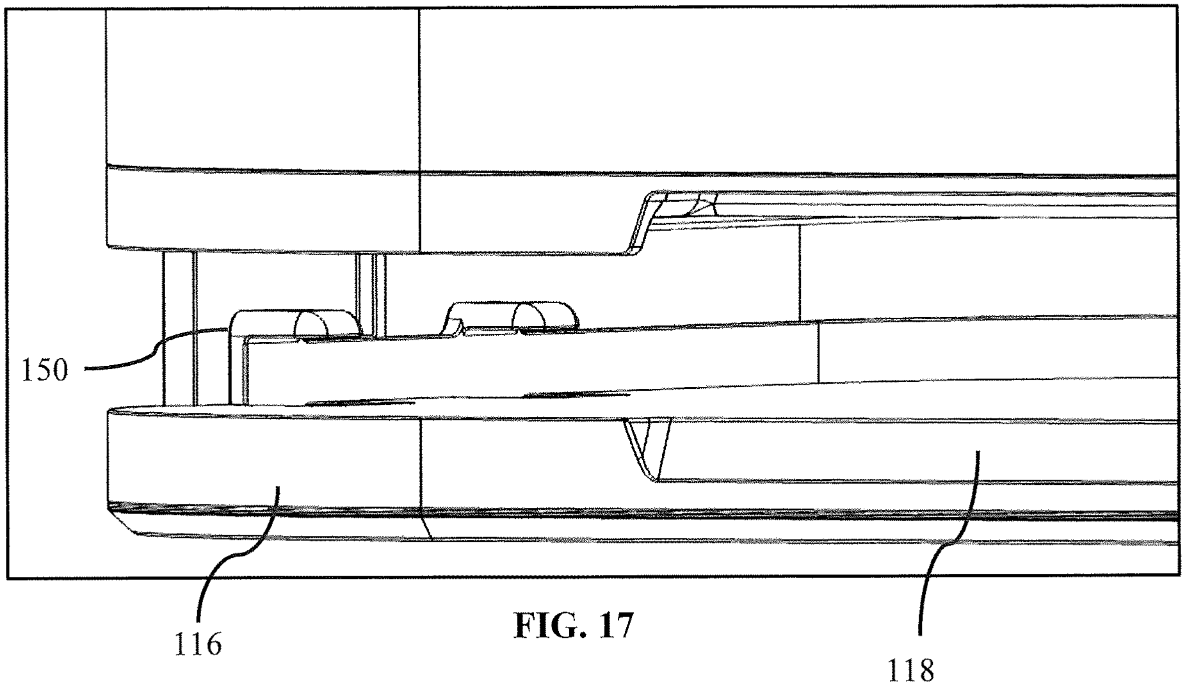
FIG. 17 is an elevation view of an interior portion of the base showing a set of cutting board storage slots.

FIG. 16 shows the device (170) with cookware and lid (138) in place on the top frame (140) as the pieces are all in place for storage, and with utensil drawer (114) extended from the base (101). FIG. 17 shows a magnified view of the interior back portion of the base (101), where the drawer (114) and cutting boards (116) are stored. A set of guide tabs (150) are arranged on each side of the slidable storage compartment. The guide tabs (150) support the drawer (114) and cutting boards (116) when inserted in their corresponding storage locations, and allow for easy insertion and removal during use, without complicated fixed sliding rails.

Figure 18:
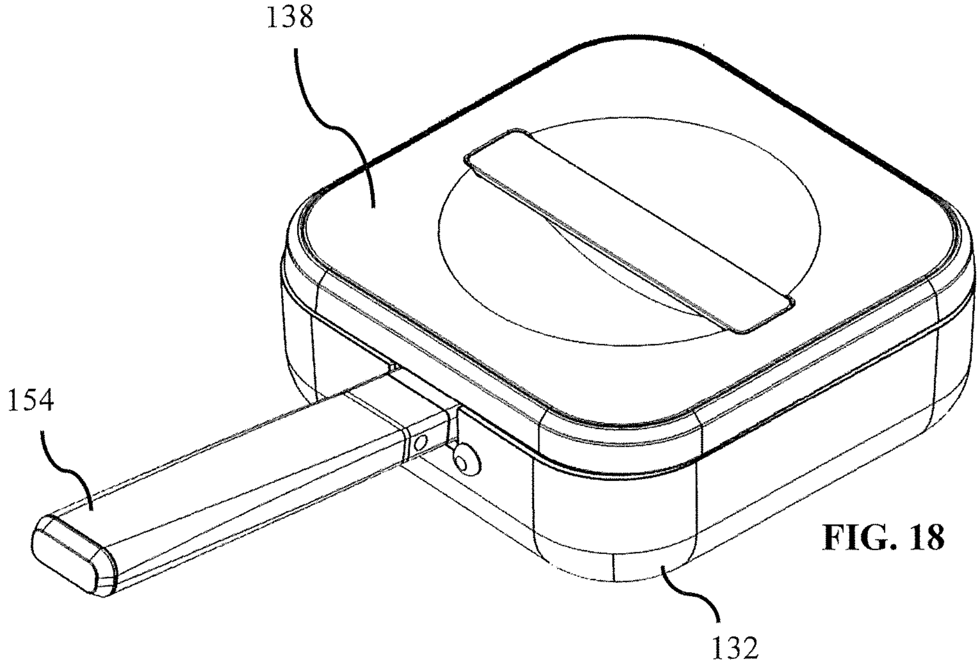
FIG. 18 is a perspective view of a pan with the lid of FIG. 13 removed from the compact storage device and placed on the pan.
Figure 19:
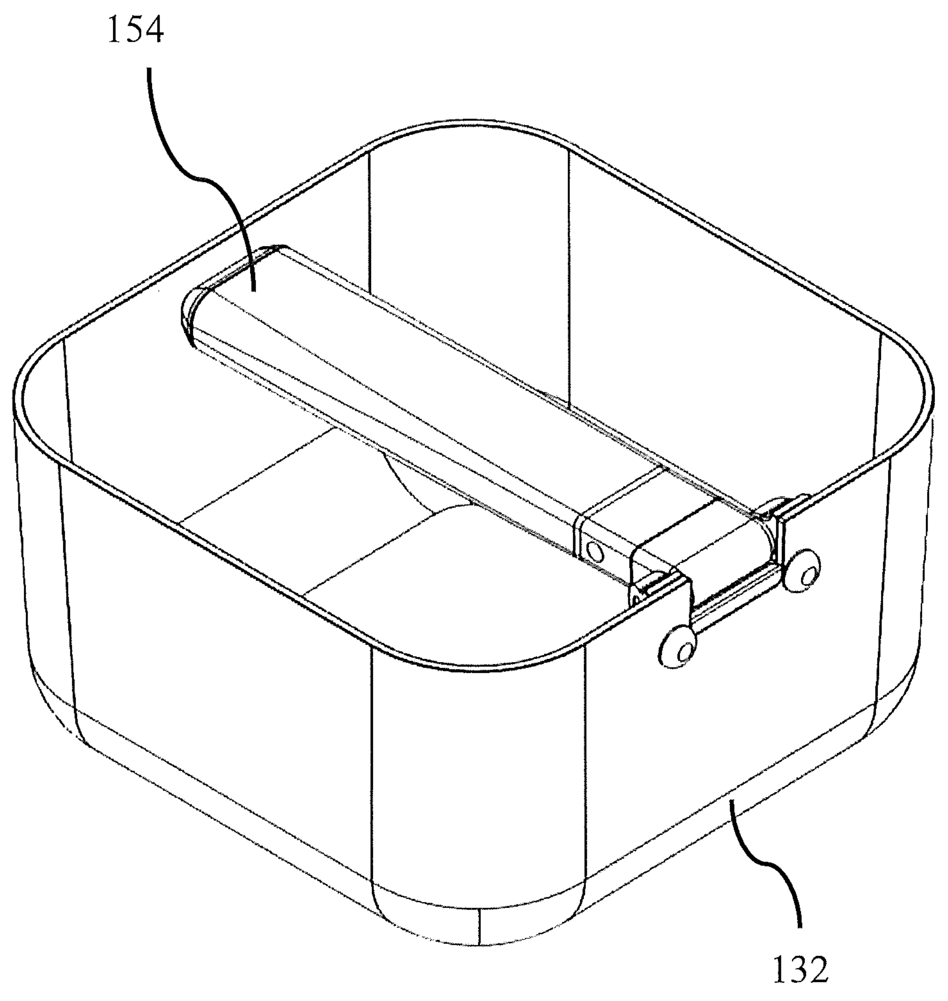
FIG. 19 is a perspective view of the pan of FIG. 18 with the lid removed, and a handle of the pan folded into a storage position.

FIG. 18 is a top down view of a pan (132) with lid (138) situated on the pan (132) and the handle (154) engaged in the "in use" position with nuts and bolts or another mechanical fixture supporting the handle placement, and allowing for rotation around an axis proximate to connection point to the pan (132), such that the handle may be rotatably stored within the pan (132) or rotated out of the pan (132) for use. The pan could be a grill pan or skillet pan, traditional pan, or other various pan or pot. The handle (154) on this design is already attached, and is in an "in use" engaged position for use during cooking. However, recall that a detachable handle has also earlier been conceived, and could be used in some implementations instead of or in addition to the folding handle (154). The objective is to keep all food, water, etc. during cooking contained within the pot, pan, etc. and the configuration of the handle was carefully selected to enable this function while also allowing the handle to fold into the pan, pot, etc. for storage in the corners of the system. FIG. 19 is a top-down view of the handle (154) in the folded-in position stored within the pot (120) for easy storage, again also showing curved corners of the pot (120).

Figure 20:
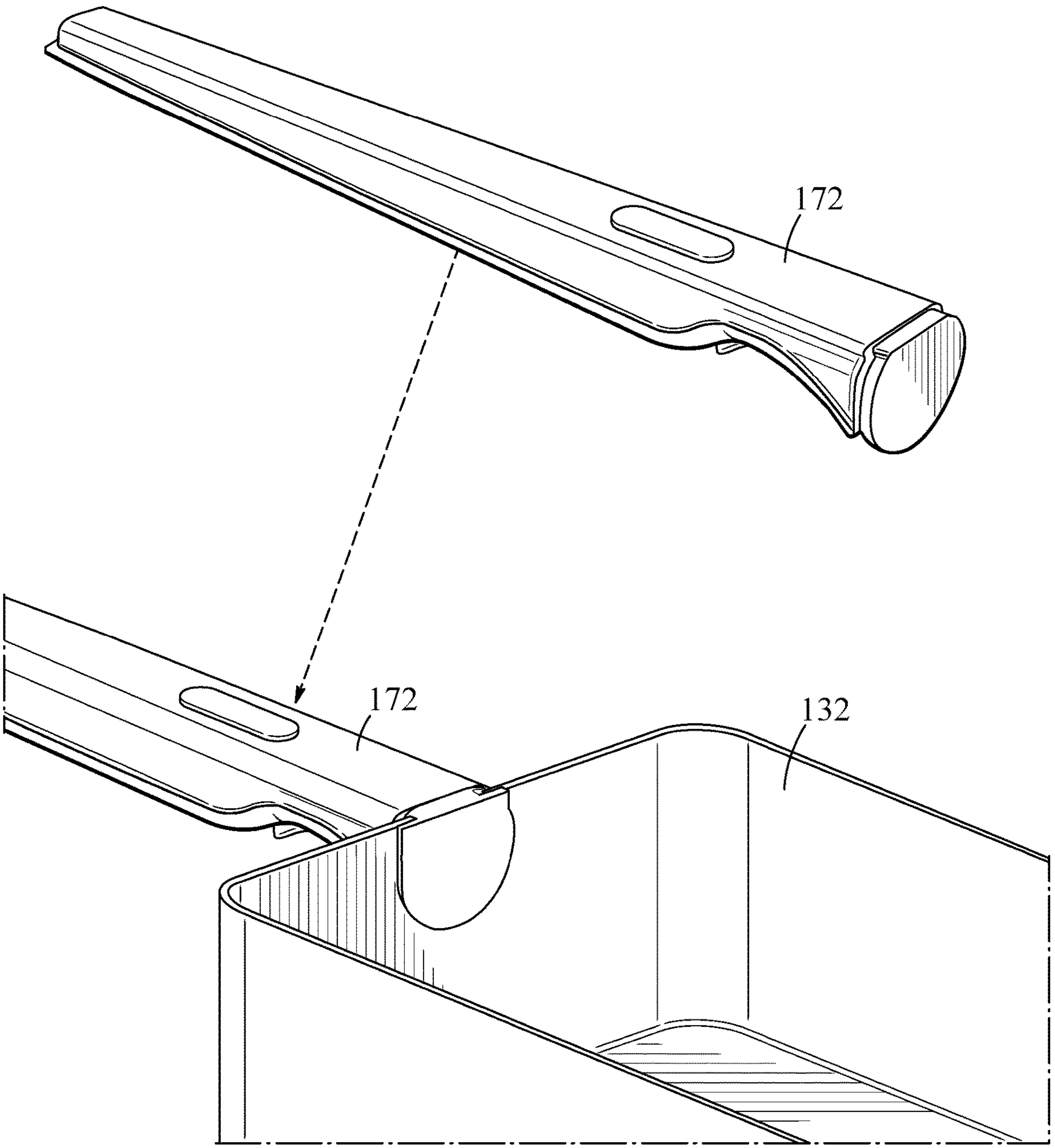
FIG. 20 is a perspective view of an alternate pot handle using a magnetic connection detached from the pot and attached to the pot.

FIG. 20 illustrates an alternative detachable handle design, having a magnetic end on the handle (172) and a matching metallic or magnetic portion on the cookware (174), here a pan (132), such that the magnetic connection holds the handle into place during use, and allows it to be pulled, tilted, or slid off for storage.

Figure 21A:
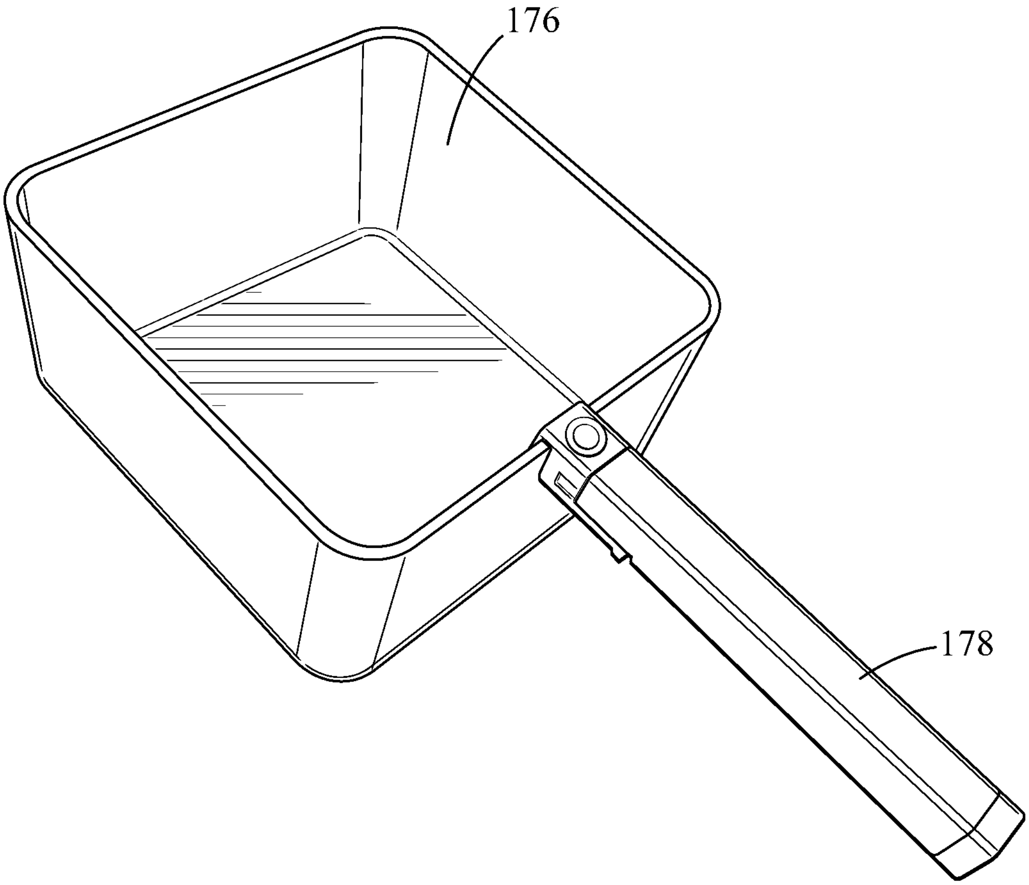
FIG. 21A illustrates an alternate embodiment of a pot with a removably connected handle, in accordance with the present invention.
Figure 21B:
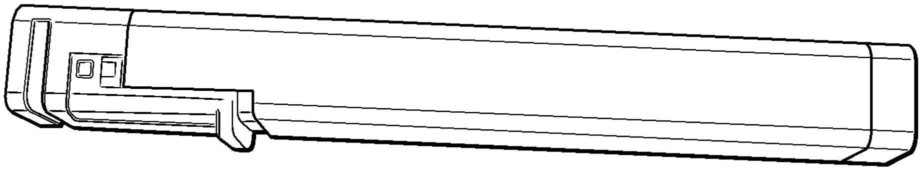
FIG. 21B shows the handle of FIG. 21A, but disconnected from the pot.
Figure 21C:
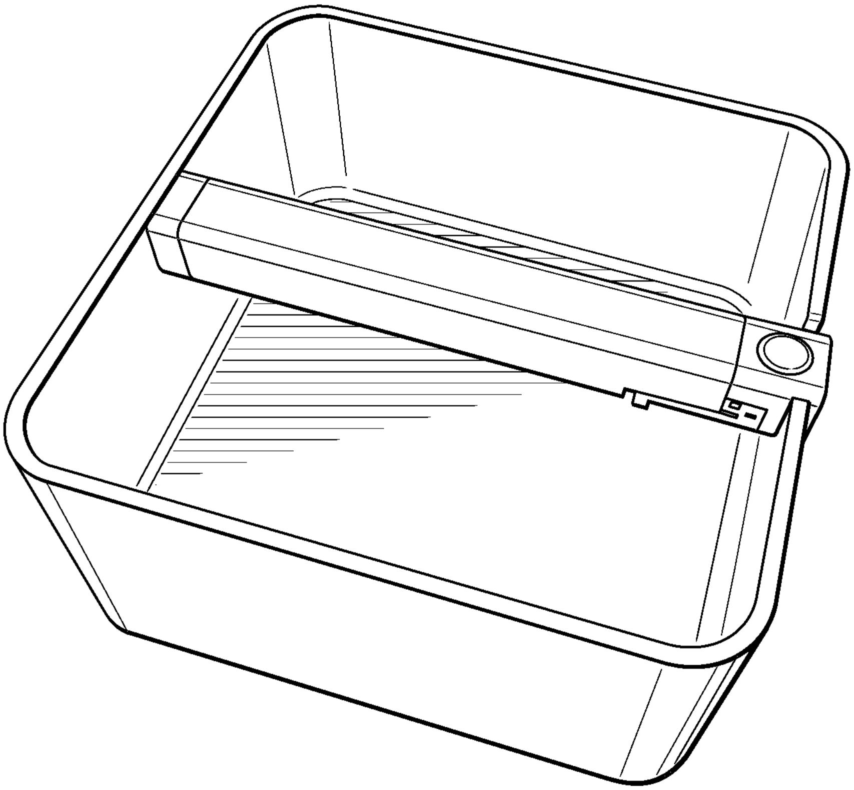
FIG. 21C shows the handle and the pot shown in FIG. 21A, but with the handle connected and in a storage mode.
Figure 21D:
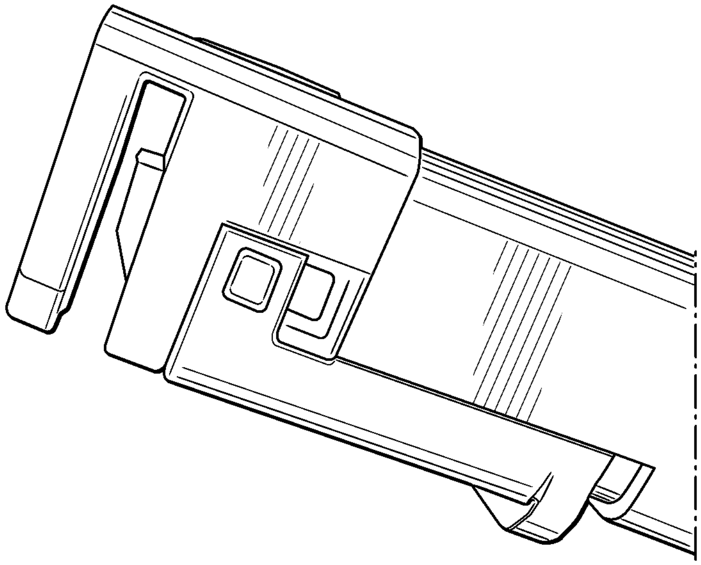
FIG. 21D is a close up view of the attachable end of the handle that is shown in FIGS. 21A, 21B, and 21C.

FIGS. 21A, 21B, 21C, AND 21D show an alternative design for a mechanical detachable handle (178) that is detachable from the cookware (176), but which can be mechanically attached thereto for use and also for storage, as shown by FIG. 21C. Rather than gripping to the side of a pot and pan, as some handles do, the mechanical detachable handle (178) has a "click-in" locking mechanism that allows it to attach into a specific part on pots and pans that has been finely designed for attachment. In some implementations, the handle (178) may include a bottom lever that may be actuated to allow the handle to attach and detach from a pot or pan and may include a feature to create a clicking noise when locking the handle in place to ensures that the user is ready to cook.

Additional features and implementations exist and will be apparent to those of ordinary skill in the art in light of this disclosure. For example, measuring cups and other cookware utensils could be stored and retrieved from inside the center cubby hole (136) or from one of the corner cubbies (144), as shown in FIG. 12A. Other variations of handles may also be possible, depending on the desired aesthetics, as has been described. A knife sharpening tool is another conceived utensil that has potential to be added into the utensil drawer (114) or cubby hole in the center of the box frame (136) where the hollow core is currently located, such as shown in FIG. 2. Applicant intends this disclosure to be exemplary with respect to the disclosed subject matter, not limiting. In other words, those skilled in the art will recognize from this specification that various modifications are possible without departing from the scope of the compact cookware and utensil storage device. For example, the particular combination of pots, pans, bowls, and the like could be modified. Also, some dimensions could be varied.

It should be understood that any one or more of the teachings, expressions, embodiments, examples, etc. described herein may be combined with any one or more of the other teachi142ngs, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

The invention claimed is:

1. A cookware and utensil storage system comprising:

a box-shaped frame, the frame including spaced horizontally oriented bottom and top portions and a midportion extending therebetween;

the midportion receiving a swivel tab secured to the bottom portion and a base supporting the swivel tab thereon and rotatable relative to the bottom portion, and four outer walls extending upwardly from the base so as to define, with the top portion, four horizontally accessible volumes at the four corners of the frame, with each of the four accessible volumes being open and accessible in a different direction;

at least four cookware items, with at least one of the cookware items being removably received within each of the horizontally accessible volumes, so as to present, when removably received therein, an outer vertical surface that is substantially contiguous with the corresponding outer wall of the frame, whereby when each of the four horizontally accessible volumes has one or more of the cookware items therein, the resulting structure has a generally square shape in horizontal cross-section; and the top portion and the midportion being rotatable relative to the bottom portion about the swivel tab, thereby to enable a user to rotate the top portion and the midportion so as to enable desired rotated positioning of the box-shaped frame for easy retrieval of the at least one cookware item from one of the horizontally accessible volumes wherein the cookware items are generally square in horizontal cross-sectional shape, the cookware items comprising at least a pot, a pan, and a bowl, and having a vertical dimension so as to fit into the volumes, with either one pot per volume, or one bowl per volume, or two pans per volume, with the pans being either or both of a grill pan and a frying pan and half the height of the bowl and the pot.

2. The system of claim 1 and further including:

at least one drawer located in the base, and adapted to hold one or more utensils, and a cutting board slidably received within the base, above or below the drawer, accessible along the same outer wall as the drawer.

3. The system of claim 2 and further comprising:

a universal handle removably connectable to each of the cookware items, and lockable into place when connected thereto, the universal handle adapted to be stored in the drawer.

4. The system of claim 1 and further including:

a removable universal lid located at and sized to be received within an upper end of the top portion, the universal lid sized to fit an open top end of the pot, the bowl, and the pans.

5. The system of claim 1 wherein an overall footprint is less than about one square foot (1'×1'), with a height of less than about 18 inches, and each of the cookware items is 8"×8".

6. A cookware and utensil storage system comprising:

a box-shaped frame, the frame including spaced horizontally oriented bottom and top portions and a midportion extending therebetween, the bottom portion including a rotatable plate adapted to rotate relative thereto;

the midportion further including a generally horizontally oriented base removably secured to the bottom portion, and four outer walls extending upwardly from the base so as to define, with the top portion, four horizontally accessible volumes at the four corners of the frame, with each of the four accessible volumes being open and accessible in a different direction;

at least four cookware items, with at least one of the cookware items being removably received within each of the horizontally accessible volumes, so as to present, when removably received therein, an outer vertical surface that is substantially contiguous with the corresponding outer wall of the frame, whereby when each of the four horizontally accessible volumes has one or more of the cookware items therein, the resulting structure has a generally square shape in horizontal cross-section; and the top portion and the midportion being rotatable with the rotatable plate relative to the bottom portion, thereby to enable a user to rotate the top portion and the midportion so as to enable desired rotated positioning of the box-shaped frame for easy retrieval of the at least one cookware item from one of the horizontally accessible volumes wherein the cookware items are generally square in horizontal cross-sectional shape, the cookware items comprising at least a pot, a pan, and a bowl, and having a vertical dimension so as to fit into the volumes, with either one pot per volume, or one bowl per volume, or two pans per volume, with the pans being either or both of a grill pan and a frying pan and half the height of the bowl and the pot.

7. The system of claim 6 and further including:

at least one drawer located in the base, and adapted to hold one or more utensils, and a cutting board slidably received within the base, above or below the drawer, accessible along the same outer wall as the drawer.

8. The system of claim 7 and further comprising:

a universal handle removably connectable to each of the cookware items, and lockable into place when connected thereto, the universal handle adapted to be stored in the drawer.

9. The system of claim 6 and further including:

a removable universal lid located at and sized to be received within an upper end of the top portion, the universal lid sized to fit an open top end of the pot, the bowl, and the pans.

10. The system of claim 6 wherein an overall footprint is less than about one square foot (1'×1'), with a height of less than about 18 inches, and each of the cookware items is 8"×8".

* * * * *